United States Patent [19]

Suzuki et al.

[11] Patent Number: 4,914,225

[45] Date of Patent: * Apr. 3, 1990

[54] ACRYLAMIDE DERIVATIVES AND THEIR POLYMERS

[75] Inventors: Yuji Suzuki, Osaka; Satoshi Urano, Kyoto; Hirotoshi Umemoto, Kyoto; Ryuzo Mizuguchi, Kyoto; Kei Aoki, Nara; Noriyuki Tsuboniwa, Osaka, all of Japan

[73] Assignee: Nippon Paint Co., Ltd., Osaka, Japan

[ * ] Notice: The portion of the term of this patent subsequent to Sep. 25, 2001 has been disclaimed.

[21] Appl. No.: 42,893

[22] Filed: Apr. 27, 1987

[30] Foreign Application Priority Data

Apr. 25, 1986 [JP] Japan ................................. 61-97760
Apr. 25, 1986 [JP] Japan ................................. 61-97761

[51] Int. Cl.$^4$ .......................................... C07C 103/92

[52] U.S. Cl. ..................................... 560/145; 526/285; 526/304; 560/172; 564/159

[58] Field of Search .................................. 560/172, 145

[56] References Cited

FOREIGN PATENT DOCUMENTS 0020000 6/1983 European Pat. Off. .

OTHER PUBLICATIONS

Weygand, "Preparative Organic Chemistry," 4th Ed. pp. 488–497 (1972).

Primary Examiner—Michael L. Shippen
Attorney, Agent, or Firm—Wegner & Bretschneider

[57] ABSTRACT

A polymer comprising a carbon-carbon backbone chain and at least one N-(substituted oxalyl)carbamoyl group of the formula: —CO—NH—CO—CO—OR wherein R is a hydrocarbon group as a side chain attached to said backbone chain.

8 Claims, No Drawings

ACRYLAMIDE DERIVATIVES AND THEIR POLYMERS

The present invention relates to acrylamide derivatives and their polymers. More particularly, it relates to highly reactive N-(substituted oxalyl)acrylamides and their polymers, and their production and use.

Acrylamide of the formula:

$$CH_2=CH-CO-NH_2 \qquad (I)$$

is known to be useful as the starting material for production of various functional derivatives. For instance, it is reacted with an oxalyl dihalide to give acryloyl isocyanate of the formula:

$$CH_2=CH-CO-NCO \qquad (A)$$

which is highly reactive at the ethylenic unsaturation and also at the isocyanato group.

The present invention provides N-(substituted oxalyl)acrylamides as the derivatives of acrylamide (I). It also provides polymers derivable from said N-(substituted oxalyl)acrylamides, i.e. those comprising a carbon-carbon backbone chain and at least one N-(substituted oxalyl)carbamoyl group attached thereto. These polymers are useful as resin components in coating, adhesive and molding compositions.

The N-(substituted oxalyl)acrylamides of the invention are representable by the formula:

$$CH_2=CH-CO-NH-CO-CO-OR \qquad (II)$$

wherein R is a hydrocarbon group.

With respect to the hydrocarbon group represented by the symbol R, there is no particular limitation on the molecular weight, but it may be usually not more than about 500. Specific examples of the hydrocarbon group are an alkyl group such as lower alkyl (e.g. methyl, ethyl, propyl, butyl), an alkenyl group such as lower alkenyl (e.g. allyl, butenyl), an alkynyl group such as lower alkynyl (e.g. butynyl, pentynyl), a cycloalkyl group such as cyclo(lower)alkyl (e.g. cyclopentyl, cyclohexyl), an aryl group such as phenyl, an aralkyl group such as ar(lower)alkyl (e.g. benzyl, phenethyl), an alkyl group substituted with a group of the formula: —O—R' (in which R' is an unsaturation-containing hydrocarbon group such as lower alkenyl) such as lower alkenyloxy(lower)alkyl (e.g. allyloxymethyl, allyloxyethyl), etc.

In EP-0020000 (Example 12), it is described that N-ethyoxalylacrylamide, i.e. the N-(substituted oxalyl)acrylamide (II: R=C$_2$H$_5$), is prepared jointly with N,N-bis(ethoxalylacrylamide) by the condensation reaction of acrylamide with diethyl oxalate or ethyl oxalyl chloride in the presence of potassium t-butoxide, i.e. stirring a mixture of the reagents at room temperature for 1 to 5 days. But, any physical constant of the objective substance is not given therein. Follow-up examinations were repeatedly carried out under various reaction conditions including those as described in said prior art. As the results, it has been ascertained that N-ethoxalylacrylamide can be produced only under somewhat restricted conditions which are not disclosed in said prior art, while N,N-bis(ethoxalylacrylamide) is not obtainable.

According to this invention, there are provided some procedures for production of the N-(substituted oxalyl)acrylamides (II) with high yields. One of such procedures comprises the reaction between the acrylamide (I) and an oxalyl monohalide monoester of the formula:

$$X-CO-CO-OR \qquad (III)$$

wherein X is a halogen atom (e.g. chlorine, bromine) and R is as defined above in an inert solvent in the presence or absence of a basic substance at a temperature of about 20 to the refluxing temperature of the reaction system. The molar proportion of the acrylamide (I) and the oxalyl monohalide monoester (III) to be used in the reaction may be from about 10:1 to 1:10, preferably from about 5:1 to 1:5. The inert solvent is chosen preferably from aromatic hydrocarbons (e.g. benzene, toluene, xylene), ethers (e.g. diethyl ether, tetrahydrofuran, dioxane), etc.

When the reaction is effected in the presence of a basic substance, there is obtained the N-(substituted oxalyl)acrylamide (II) as the direct product. As the basic substance, there may be used an organic or inorganic base such as triethylamine, dimethylaniline, pyridine, ethoxide or potassium t-butoxide, normally in about an equivalent amount to the acrylamide (I). In general, charging of the reagents into the reaction system is to be effected in the following order: i.e. the basic substance, the acrylamide (I) and then the oxalyl monohalide monoester (III) or either one of the acrylamide (I) and the oxalyl monohalide monoester (III), the other and then the basic substance. It is thus preferred to avoid the direct contact between the oxalyl monohalide monoester (III) and the basic substance, particularly when the basic substance is an inorganic one.

When the reaction is effected in the absence of a basic substance, there is first obtained an N-(substituted oxalyl)-halopropionamide of the formula:

$$X-CH_2CH_2-CO-NH-CO-CO-OR \qquad (IV)$$

wherein R and X are each as defined above. Then, the N-(substituted oxalyl)-halopropionamide (IV) is treated with a basic substance, if desired, in an inert solvent to give the N-(substituted oxalyl)acrylamide (II). The reaction conditions and the kinds of the basic substance and the inert solvent in the latter step may be as stated above.

On the reaction in the absence of a basic substance, the use of any hydrogen halide-capturing agent other than the basic substance or the adoption of any means for elimination of hydrogen halide, the N-(substituted oxalyl)acrylamide (II) is obtainable as the direct product. As the hydrogen halide-capturing agent, there may be used large excess of the acrylamide (I). As the elimination means, refluxing or bubbling with an inert gas (e.g. nitrogen gas) is applicable.

Post-treatment may be carried out by a per se conventional procedure, for instance, by extracting the reaction mixture with an appropriate organic solvent and subjecting the extract to column chromatography, recrystallization or distillation under reduced pressure.

In an alternative, the N-(substituted oxalyl)acrylamide (II) may be prepared through the reaction between the acrylamide (I) and an oxalyl diester of the formula:

$$RO-CO-CO-OR \qquad (V)$$

wherein R is as defined above in the presence of a basic substance.

The reaction is carried out in substantially the same manner as in the reaction between the acrylamide (I) and the oxalyl monohalide monoester (III). The basic substance is preferred to be a relatively strong one and may be chosen from inorganic bases such as potassium ethoxide or potassium t-butoxide. In general, however, the reaction conditions to be adopted are more liberal than those in case of the reaction between the acrylamide (I) and the oxalyl monohalide monoester (III). For instance, the inert solvent may be chosen from somewhat a broader scope, i.e. from aromatic hydrocarbons, halogenated hydrocarbons (e.g. carbon tetrachloride, chloroform, dichloromethane, 1,1-dichloroethane, 1,2-dichloropropane, 1,1,1-trichloroethane, 1,1,2-trichloroethane, 1,2-dichloropropane, 1,4-dichlorobutane, chlorobenzene, ethylene tetrachloride, trichloroethylene), ethers, alcohols (e.g. methanol, ethanol, propanol), etc. In place of using any inert solvent, the oxalyl diester (V) itself may be used in an excessive amount. Furthermore, for instance, the charging order of the reagents into the reaction system may be more liberal.

As the result of the reaction, there is produced the N-(substituted oxalyl)acrylamide (II) directly. In addition, there is normally by-produced an N-(substituted oxalyl)acrylamide of the formula:

CH$_2$=CH—CO—NH—CO—CO—N-H—CO—CH=CH$_2$ (VI), and the yield of this N-(substituted oxalyl)acrylamide (VI) may be higher than that of the N-(substituted oxalyl)acrylamide (II) depending on the reaction conditions.

Post-treatment of the reaction mixture and recovery of the products may be performed by a per se conventional method such as distillation, recrystallization and/or chromatography.

In another alternative, the N-(substituted oxalyl)acrylamide (II) may be prepared through the reaction between the acrylamide (I) and an oxalyl dihalide of the formula:

X—CO—CO—X (VII)

wherein X is as defined above.

The reaction is carried out in an inert solvent at a temperature of about −20° to 80° C., preferably of 0° to 20° C. The molar ratio of the acrylamide (I) and the oxalyl dihalide (VII) to be used for the reaction may be normally about 1:1-3, preferably about 1:1-1.5. The inert solvent may be chosen from hydrocarbons, halogenated hydrocarbons, ethers, esters, etc. Among them, halogenated hydrocarbons (e.g. carbon tetrachloride, chloroform, dichloromethane, 1,1-dichloroethane, 1,2-dichloropropane, 1,1,1-trichloroethane, 1,1,2-trichloroethane, 1,2-dichloropropane, 1,4-dichlorobutane, chlorobenzene, ethylene tetrachloride, trichloroethylene, chloropropane) are preferred. As the result of the reaction, there is produced an N-(substituted oxalyl)-halopropionamide of the formula:

X—CH$_2$CH$_2$—CO—NH—CO—CO—X (VIII)

wherein X is as defined above.

Then, the N-(substituted oxalyl)-halopropionamide (VIII) is reacted with an alcohol of the formula:

R—OH (IX)

wherein R is as defined above, if necessary, in an inert solvent at a temperature of about −30° to 40° C. to give the N-(substituted oxalyl)-halopropionamide (VIII). The molar proportion of the N-(substituted oxalyl)-halopropionamide (VIII) and the alcohol (IX) is normally about 1:1-20, preferably about 1:5-15. The inert solvent may be, if used, chosen from hydrocarbons, halogenated hydrocarbons, ethers, etc. The resulting product is the N-(substituted oxalyl)-halopropionamide (IV), which is then converted into the N-(substituted oxalyl)acrylamide (II) in the same manner as stated above, for instance, by treatment with a basic substance at a temperature of about −20° to 80° C., preferably 0° to 40° C. As the basic substance, there may be used an organic or inorganic base (e.g. triethylamine, dimethylaniline, pyridine, potassium ethoxide, potassium t-butoxide).

Post-treatment may be carried out in a per se conventional procedure such as distillation, recrystallization or chromatography.

Still, said N-(substituted oxalyl)acrylamide (VI) can also be produced from said N-(substituted oxalyl)halopropionamide (VIII) by reacting the latter with the acrylamide (I) and then treating the thus produced N-(substituted oxalyl)-halopropionamide of the formula:

X—CH$_2$CH$_2$—CO—NH—CO—CO—N-H—CO—CH$_2$CH$_2$X (X)

wherein X is as defined above with a basic substance. The reaction of the N-(substituted oxalyl)-halopropionamide (VIII) with the acrylamide (I) may be carried out in an inert solvent, preferably chosen from aromatic hydrocarbons, ethers, etc., at a temperature of 0° C. to the reflux temperature of the reaction system, preferably of 0° to 20° C. The subsequent treatment of the N-(substituted oxalyl)-halopropionamide (X) with the basic substance may be also carried out in an inert solvent, preferably chosen from hydrocarbons, aromatic hydrocarbons, esters (e.g. methyl acetate, ethyl acetate), ethers, etc., at a temperature of 0° C. to the reflux temperature of the reaction system. The basic substance may be chosen from organic or inorganic bases such as triethylamine, dimethylaniline, pyridine, potassium ethoxide and potassium t-butoxide.

Of various procedures as stated above, particularly preferred from the viewpoint of a better yield of the N-(substituted oxalyl)acrylamide (II) is the one wherein the acrylamide (I) is reacted with the oxalyl monohalide monoester (III) in an inert solvent in the absence of a basic substance, followed by treatment of the thus produced N-(substituted oxalyl)-halopropionamide (IV) with a basic substance. In such procedure, the use of the inert solvent having a higher dielectric constant (e.g. tetrahydrofuran) can afford the N-(substituted oxalyl)-halopropionamide (VIII) predominantly, and the use of the inert solvent having a lower dielectric constant (e.g. a mixture of hexane and tetrahydrofuran (5/1 by volume)) results in enhancement of the proportion of the N-(substituted oxalyl)acrylamide (II) in the reaction mixture. Usually, the inert solvent may be chosen from halohydrocarbons and ethers. As the basic substance, the one chosen from organic or inorganic bases (e.g. triethylamine, dimethylaniline, pyridine, potassium ethoxide, potassium t-butoxide) may be used. Usually, the use of such a weak base as chosen from organic bases, particularly tertiary amines, is preferred. When such a strong base as chosen from inorganic bases, particularly alkali metal alkoxides, is employed, its use is to be made after completion of the reaction between the acrylamide (I) and the oxalyl monohalide monoester (III).

The thus obtained N-(substituted oxalyl)acrylamide (II) has the following chemical structure, which may be divided into three portions as set forth below:

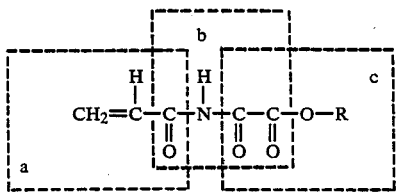

Of these three portions, the portion (a) contains a conjugated double bond structure. Thus, the N-(substituted oxalyl)acrylamide (II) can be polymerized by itself or with any other polymerizable monomer to give a polymer, which is useful as a resin component in a coating, adhesive or molding composition or the like.

The portion (b) contains a C,N-diacylamide linkage, which contributes in exertion of a high intermolecular cohesive force and a high intermolecular hydrogen bond forming property. Thus, the polymer obtained by polymerizaion of the N-(substituted oxalyl)acrylamide (II) optionally with any other polymerizable monomer shows high elasticity, toughness and adhesion.

The portion (c) contains a ketoester linkage, and the substituent R is readily exchangeable with any other substituent. Thus, various monomers being different in polarity, polymerizability, solubility, functionality, reactivity, etc. can be readily produced.

As understood from the above, the N-(substituted oxalyl)acrylamide (II) is useful as an monomeric intermediate in the synthesis of various chemical products of low or high molecular weights. A typical example of its practical utilization is the production of a polymer having excellent physical properties suitable as a resin component in coating, adhesive and molding compositions.

The polymer which can be produced by the use of the N-(substituted oxalyl)acrylamide (II) comprises a carbon-carbon backbone chain and at least one N-(substituted oxalyl)carbamoyl group of the formula:

$$-CO-NH-CO-CO-O-R \qquad (B)$$

wherein R is as defined above bonded to said chain. Such polymer has usually a molecular weight of about 1,000 to 100,000 and contains said group (B) in a content of about 0.1 to 82.8% by weight based on the weight of the polymer.

Said polymer can be produced by polymerization of the N-(substituted oxalyl)acrylamide (II) optionally with at least one other polymerizable monomer.

The other polymerizable monomer as the optional component may be chosen from a wide range of polymerizable compounds, of which examples are as follows: unsaturated acids (e.g. acrylic acid, methacrylic acid, crotonic acid, cinnamic acid, 2-isopropylacrylic acid, cis- or trans-2-decenoic acid, alpha-chloroacrylic acid, beta-trans-nitroacrylic acid), unsaturated alcohols (e.g. croton alcohol, cinnamyl alcohol, o-hydroxystyrene, ethylene glycol monoacrylate, ethylene glycol monomethacrylate, propylene glycol monoacrylate, propylene glycol monomethacrylate), unsaturated amides (e.g. acrylamide, methacrylamide, crotonamide, cinnamylamide, p-benzadmidostyrene), unsaturated sulfonic acids (e.g. 2-sulfoethyl acrylate, 2-sulfoethyl methacrylate, t-butyl acrylamidosulfonic acid, 4-sulfophenyl acrylate, p-vinylbenzenesulfonic acid), unsaturated phosphoric acids (e.g. acid phosphoxyethyl methacrylate, 3-chloro-2-amidophosphoxypropyl methacrylate, acid phosphoxypropyl methacrylate, vinyl phosphate, isopropenyl phosphate), unsaturated amines (e.g. allylamine, o-aminostyrene, m-aminostyrene, t-butylaminoethyl methacrylate, 7-amino-3,7-dimethyloctyl acrylate), monoolefinic or diolefinic hydrocarbons (e.g. styrene, alpha-methylstyrene, alpha-ethylstyrene, isobutylene, 2-methylbutene-1, 2-methylpentene-1, 2,3-dimethylbutene-1, 2,3-dimethylpentene-1, 2,4-dimethylpentene-1, 2,3,3-trimethylpentene-1, 2,3-dimethylhexene-1, 2,4-dimethylhexene-1, 2,5-dimethylhexene-1, 2-methyl-3-ethylpentene-1, 2,3,3-trimethylpentene-1, 2,3,4-trimethylpentene-1, 2-methyloctene-1, 2,6-dimethylheptene-1, 2,6-dimethyloctene-1, 2,3-dimethyldecene-1, 2-methylnonadecene-1, ethylene, propylene, butylene, amylene, hexylene, 1,3-butadiene, isoprene), halogenated monoolefinic or diolefinic hydrocarbons (e.g. alpha-chlorostyrene, alpha-bromostyrene, 2,5-dichlorostyrene, 2,5-dibromostyrene, 3,4-dichlorostyrene, o-, m- or p-fluorostyrene, 2,6-dichlrostyrene, 2,6-difluorostyrene, 3-fluoro-4-chlorostyrene, 3-chloro-4-fluorostyrene, 2,4,5-trichlorostyrene, dichloromonofluorostyrene, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- or trans-1,2-dichloroethylene, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene 1,1-difluoroethylene, 1,1-diiodoetylene, 1,1,2-trifluoroethylene, chlorobutadiene), organic or inorganic acid esters (e.g. vinyl acetate, vinyl propionate, vinyl butyrate, vinyl isobutyrate, vinyl valerate, vinyl caproate, vinyl enanthete, vinyl benzoate, vinyl toluate, vinyl p-chlorobenzoate, vinyl o-chlorobenzoate, vinyl p-methoxybenzoate, vinyl p-ethoxybenzoate, methyl methacrylate, ethyl methacrylate, propyl methacrylte, butyl methacrylate, amyl methacrylate, octyl methacrylate, decyl methacrylate, methyl crotonate, ethyl tiglate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, dodecyl acrylate, isopropenyl acetate, isopropenyl propionate, isopropenyl butyrate, isopropenyl isobutyrate, isopropenyl valerate, isopropenyl caproate, isopropenyl enanthete, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate, isopropenyl alpha-bromopropionate, vinyl alpha-chloroacetate, vinyl alpha-bromoacetate, vinyl alpha-chloropropionate, vinyl alpha-bromopropionate, vinyl alpha-chlorobutyrate, vinyl alpha-chlorovalerate, vinyl alpha-bromovalerate, allyl chloride, allyl cyanide, allyl bromide, allyl fluoride, allyl iodide, allyl chloride carbonate, allyl nitrate, allyl thiocyanate, allyl formate, allyl acetate, acetate propionate, allyl butyrate, allyl valerate, allyl caproate, allyl 3,5,5-trimethylhexanoate, allyl benzoate, allyl acrylate, ally crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, methallyl chloride, methallyl bromide, methallyl nitrate, methallyl thiocyanate, methallyl acetate, methallyl propionate, methallyl butyrate, methallyl valerate, methallyl benzoate, methallyl chloropropionate, beta-ethylallyl acetate, beta-propylallyl acetate, 4-acetoxy-1-butene, 4-acetoxy- 2-methylbutene, 4-acetoxy-2-(2,2-dimethylpropyl)-1-butene, 4-acetoxy-1-pentene, methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylae, isopropyl alpha-chloroacrylate, isopropyl alpha-bromoacrylate, amyl alpha-chloroacrylate, decyl alpha-chloroacrylate, methyl alpha-cyanoacrylate, ethyl alpha-cyanoacrylate, amyl alpha-cyanoacrylate, decyl alpha-cyanoacrylate, dimethyl maleate, diethyl maleate, diallyl maleate, dimethyl fumarate, diethyl fumarate, dimethacryl fumarate, diethyl glutaconate), organic nitriles (e.g. acrylonitrile, methacrylonitrile, ethacrylonitrile, 3-octenenitrile, crotonitrile, oleonitrile), unsaturated alcohols (e.g. allyl alcohol, ethylene glycol monoacrylate, ethylene glycol monomethacrylate, propylene glycol monoacrylate, crotonalcohol, cinnamyl alcohol, o-hydroxystyrene), unsaturated amides (e.g. acrylamide, methacrylamide, crotonamide, cinnamylamide, p-benzamidostyrene), etc. These other polymerizable monomers may be used alone or in combination.

In any event, the N-(substituted oxalyl)acrylamide (II) may be used in an amount of not less than about 0.1% by weight on the basis of the total weight of the monomeric components. When the amount is less than 0.1% by weight, the physical properties characteristic to the N-(substituted oxalyl)acrylamide (II) will be hardly imparted to the produced polymer.

The polymerization is normally carried out in an inert solvent in the presence of a polymerization initiator. As the polymerization initiator, there is usually employed a radical initiator such as azobisisobutyronitrile, benzoyl peroxide, cumene hydroperoxide, tetramethyl thiuram disulfide, 2,2-azobis(4-methoxy-2,4-dimethylvaleronitrile), acetylcyclohexylsulfonyl peroxide or 2,2'-azobis(2,4-dimethylvaleronitrile. The amount of the polymerization initiator may be from about 0.1 to 10% by weight based on the total weight of the monomer components. Examples of the inert solvent are aliphatic hydrocarbons (e.g. pentane, hexane, heptane), aromatic hydrocarbons (e.g. benzene, toluene, xylene), alicyclic hydrocarbons (e.g. cyclohexane, methyl-cyclohexane, decalin), petrolic hydrocarbons (e.g. petroleum ether, petroleum benzin), halogenated hydrocarbons (e.g. carbon tetrachloride, chloroform, 1,2-dichloroethane), ethers (e.g. ethyl ether, isopropyl ether, anisole, dioxane, tetrahydrofuran), ketones (e.g. acetone, methylethylketone, methylisobutylketone, cyclohexanone, acetophenone, isophorone), esters (e.g. ethyl acetate, butyl acetate), acetonitrile, dimethylformamide, dimethylformsulfoxide), etc. These solvents may be used alone or in combination.

The polymerization temperature is ordinarily from about 40° to 200° C., preferably from about 60° to 150° C. When the temperature is higher than about 200° C., side-reactions may take place. When the temperature is too low, the reaction rate becomes too small. When desired, any other additive such as a polymerization regulator may be incorporated into the reaction system.

The thus obtained polymer has usually a molecular weight of about 1,000 to 100,000, preferably of about 2,000 to 80,000. Such polymer is per se useful as a resin component, for instance, in coating, adhesive and molding compositions. The polymer is partially representable by either one of the following formulas:

(Homopolymer)

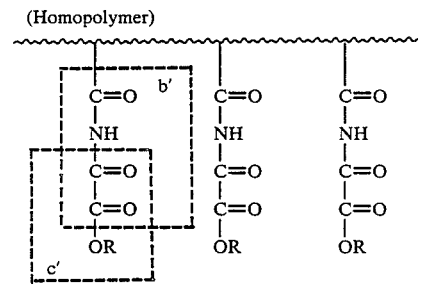

and (Copolymer)

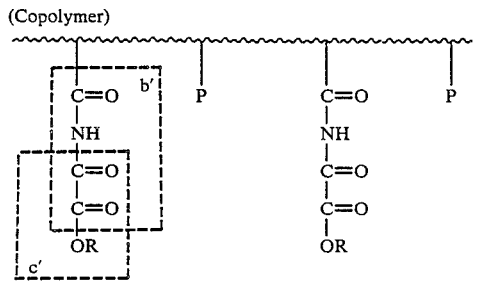

wherein P is a pendant originated from the other polymerizable monomer. As stated above, the portion (b') contains the C,N-diacylamide linkage and has high intermolecular cohesion force and high hydrogen bond forming property. Thus, this portion contributes in imparting high elasticity, toughness, adhesion, dispersibility, diffractivity, etc. to the polymer. The portion (c') contains a ketoester linkage, and the substituent R is readily exchangeable with any other substituent. Thus, the substituent R may be appropriately replaced by any other substituent so as to impart polymerization characteristics, polarity, solubility, reactivity, etc. to the polymer. In addition, the use of any proper monomer as the other polymerizalble monomer makes it possible to incorporate a favorable pendant into the polymer so that desired properties can be likewise imparted thereto.

The polymer of this invention is thus useful as a resin component in coating, adhesive and molding compositions.

Practical embodiments of this invention are illustratively shown in the following Examples. The terms Mn and Mw indicate respectively the number average molecular weight and the weight average molecular weight.

EXAMPLE 1

To a solution of acrylamide (71 g; 1 mol) in methylene chloride (200 g), oxalyl chloride (127 g; 1 mol) was dropwise added for 30 minutes under ice-cooling. After completion of the dropwise addition, the reaction mixture was cooled to room temperature to give a 50% solution of N-(3-chloropropionyl)aminooxalyl chloride.

EXAMPLE 2

To a solution of ethanol (13.8 g; 0.3 mol) in methylene chloride (100 ml), a 50% solution of N-(3-chloropropionyl)aminooxalyl chloride in methylene chloride (100 g; 0.25 mol) was portionwise added in 30 minutes at a temperature below 25° C. under stirring. After completion of the dropwise addition, the precipitated solid was removed by filtration, and the solvent was evaporated under reduced pressure. The crude product thus obtained was purified by silica gel column chromatography and recrystallized from a mixture of benzene and hexane to give N-ethyloxalyl-3-chloropropionamide (41.5 g) as colorless prism-like crystals. Yield, 80%. M.P., 79°–80° C.

IR $\nu$: 3350 (N—H), 1790 (C=O), 1760 (C=O), 1740 (C=O), 1500 (N—H, deformation) cm$^{-1}$.

EXAMPLE 3

To a solution of N-ethyloxalyl-3-chloropropionamide (41.5 g; 0.2 mol) in benzene, triethylamine (20.2 g; 0.2 mol) was added, and the resultant mixture was stirred at room temperature for 30 minutes. The precipitated salt was removed by filtration, and the solvent was evaporated under reduced pressure. The crude product thus obtained was purified by silica gel column chromatography to give N-ethyloxalylacrylamide (29.5 g) as a white solid. Yield, 86%. M.P., 40°–41° C.

TLC Rf=0.54 (determined by Merck Art 5808$^R$; developing solvent, hexane/ethyl acetate=1/1 by volume).

IR $\nu$: 3300 (N—H), 1770 (C=O), 1740 (C=O), 1700 (C=O), 1630 (C=O), 1490 (N—H, deformation) cm$^{-1}$.

EXAMPLES 4 to 7

In the same manner as in Example 2 but changing the kind and amount of the alcohol as well as the amount of the N-(3-chloropropionyl)aminooxalyl chloride solution, the products as shown in Table 1 were obtained.

TABLE 1

| Example No. | Alcohol (Amount (g; mol)) | N-(3-Chloropropionyl)aminooxalyl chloride (Amount (g; mol)) | Product | Amount (g) | Yield (%) | M.P. (°C.) |
|---|---|---|---|---|---|---|
| 4 | Allyl alcohol (17.4; 0.3) | 100 (0.25) | N-Allyloxalyl-3-chloropropionamide | 7.2 | 13 | 50–52 |
| 5 | Propargyl alcohol (16.8; 0.3) | 100 (0.25) | N-Propargyloxalyl-3-chloropropionamide | 5.0 | 9.2 | 85–86.5 |
| 6 | 2-Hydroxyethyl methacrylate (39.0; 0.3) | 100 (0.25) | N-2-Hydroxyethylmethacryloxalyl-3-chloropropionamide | 4.0 | 5.4 | Oil |
| 7 | Benzyl alcohol (32.4; 0.3) | 100 (0.25) | N-Benzyloxalyl-3-chloropropionamide | 2.7 | 4.0 | 106–107 |

EXAMPLE 8

To a tetrahydrofuran solution of sodium hydride (6.0 g; 0.25 mol), a solution of phenol (23.5 g; 0.25 mol) in benzene (300 ml) was added. After cooling to room temperature, a 50% methylene chloride solution of N-(3-chloropropionyl)aminooxalyl chloride (100 g; 0.25 mol) was portionwise added thereto. After 30 minutes, the reaction mixture was extracted with deionized water (300 ml) three times. The organic layer was dried over anhydrous sodium sulfate, the solvent was evaporated under reduced pressure, and the resulting brown oil was crystallizeed out from a mixture of hexane and benzene to give N-phenyloxalyl-3-chloropropionamide (2.6 g). Yield, 10.0%. M.P., 95°–96° C.

EXAMPLES 9 TO 13

In the same manner as in Example 3 but changing the kinds of the amide and the solvent as well as the amounts of the amine and the triethylamine, the products as shown in Table 2 were obtained.

TABLE 2

| Example No. | Amide (Amount) (g; mol)) | Triethylamine (Amount (g; mol)) | Solvent | Product | Amount (g) | Yield (%) | M.P. (°C.) |
|---|---|---|---|---|---|---|---|
| 9 | N-Allyloxalyl-3-chloropropionamide (2.1; 0.01) | 1.0 (0.01) | Benzene | N-Allyloxalylacrylamide | 1.8 | 91 | 42–43.5 |
| 10 | N-Propargyloxalyl-3-chloropropionamide (2.3; 0.01) | 1.0 (0.01) | Benzene | N-Propargyloxalylacrylamide | 0.8 | 44 | 102–103 |
| 11 | N-(2-Hydroxyethylmethacryloxalyl)-3-chloropropionamide (2.3; 0.01) | 1.0 (0.01) | Benzene | N-(2-Hydroxyethylmethacryl)oxalyl acrylamide | 2.2 | 85 | Oil |
| 12 | N-Benzyloxalyl-3-chloropropionamide (2.7; 0.01) | 1.0 (0.01) | Ethyl | N-Benzyloxalyl acrylamide | 2.2 | 94 | 88–89 |
| 13 | N-Phenyloxalyl- | 1.0 | Ethyl | N-Phenyloxalyl | 1.7 | 79 | 99–100 |

TABLE 2-continued

| Example No. | Amide (Amount) (g; mol)) | Triethylamine (Amount (g; mol)) | Solvent | Product | Amount (g) | Yield (%) | M.P. (°C.) |
|---|---|---|---|---|---|---|---|
| | 3-chloropropionamide (2.6; 0.01) | (0.01) | acetate | acrylamide | | | |

EXAMPLES 14 TO 18

In the same manner as in Example 2 but changing the kind and amount of the acid chloride as well as the amount of the acrylamide, the products as shown in Table 3 were obtained.

TABLE 3

| Example No. | Acid chloride (Amount (g; mol)) | Acrylamide (Amount (g; mol)) | Product | Amount (g) | Yield (%) |
|---|---|---|---|---|---|
| 14 | N-Allyloxalyl chloride (7.4; 0.05) | 3.6 (0.05) | N-Allyloxalyl-3-chloropropionamide | 4.4 | 40 |
| 15 | N-Propargyloxalyl chloride (7.3; 0.5) | 3.6 (0.05) | N-Propargyloxalyl-3-chloropropionamide | 5.4 | 50 |
| 16 | 2-Hydroxyethyl-methacryloxalyl chloride (9.9; 0.05) | 3.6 (0.05) | N-(2-Hydroxyethyl-methacryloxaly)-3-chloropropionamide | 6.27 | 43 |
| 17 | Benzyloxalyl chloride (9.9; 0.05) | 3.6 (0.05) | N-Benzyloxalyl-3-chloropropionamide | 4.31 | 55 |
| 18 | Phenyloxalyl chloride (9.2; 0.05) | 3.6 (0.05) | N-Phenyloxalyl-3-chloropropionamide | 1.66 | 32 |

EXAMPLE 19

Into a reaction vessel equipped with a stirrer, a thermometer, a nitrogen gas introducing inlet and a dropping funnel, tetrahydrofuran (50 ml) and potassium t-butoxide (5.61 g; 50 mmol) were charged at room temperature. To the mixture, acrylamide (3.55 g; 50 mmol) was added, and diethyl oxalate (7.31 g; 50 mmol) was dropwise added thereto in 5 minutes, whereby the reaction mixture turned to pale yellow paste. The resultant mixture was stirred at room temperature for 30 minutes, diethyl ether (50 ml) and acetic acid (3.0 g; 50 mmol) were addded thereto, and the precipitate was collected by filtration and washed with water and acetone to give N,N'-bis(1-oxo-2-propenyl)ethanediamide (2.0 g) as a white solid. Yield, 40% (based on the starting amide). On measurement of the melting point, it became gradually transparent at a temperature of 230°–240° C. (indefinite).

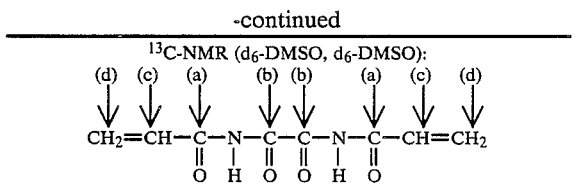

$^{13}$C-NMR (d$_6$-DMSO, d$_6$-DMSO):

| | δ(ppm) |
|---|---|
| (a) | 164.90 |
| (b) | 164.66 |
| (c) | 132.06 |
| (d) | 128.90 |

IR ν: 3450, 3250 (N—H), 3200, 1764 (C=O), 1734 (C=), 1618 (C=C) cm$^{-1}$.

From the filtrate, there was recovered 0.86 g of N-ethoxalylacrylamide by column chromatography using a mixture of ethyl acetate and hexane as the developing solvent.

EXAMPLE 20

Into a reaction vessel equipped with a stirrer, a thermometer, a nitrogen gas introducing inlet and a dropping funnel, tetrahydrofuran (50 ml) and acrylamide (3.55 g; 50 mmol) were charged. Chloroethyl oxalate (6.58 g; 50 mmol) were dropwise added thereto at room temperature in 10 minutes, followed by reflux for 2 hours. Tetrahydrofuran was removed by evaporation, and the precipitated solid material was recrystallized from a mixture of benzene and hexane to give N-ethyloxalyl-3-chloropropionamide (6.12 g). Yield, 58.8%. M.P., 79°–80° C.

EXAMPLE 21

To a solution of acrylamide (14.2 g; 0.2 mol) in methylene chloride (100 ml), a solution of N-(3-chloropropionyl)aminooxalyl chloride (39.6 g; 0.2 mol) in methylene chloride (50 ml) was dropwise added at 25° C. in 1 hour, and the resultant mixture was stirred at room temperature for 2 hours and then allowed to stand overnight. The separated oily substance was shaken with water (50 ml), and the precipitated crystals were collected and washed with acetone to give N,N'-bis(1-oxo-3-chloropropyl)ethanediamide (3.67 g). Yield, 6.8%.

IR ν: 3450 (N—H), 3300 (N—H), 1750 (C=O), 1700 (C=O) cm⁻¹.

EXAMPLE 22

To a suspension of N,N'-bis(1-oxo-3-chloropropyl)ethanediamide (3.0 g; 11 mmol) in methylene chloride (40 ml), triethylamine (2.82 g; 28 mmol) was added, and the resultant mixture was stirred at room temperature for 2 hours. The precipitated solid was collected and washed with water to give N,N'-bis(1-oxo-2-propenyl)ethanediamide (0.1 g). Yield, 4.6%.

EXAMPLE 23

Into a reaction vessel equipped with a condenser, a stirrer, a thermometer and a nitrogen gas introducing inlet, hexane (100 ml), tetrahydrofuran (20 ml), acrylamide (3.55 g; 50 mmol) and ethoxalyl chloride (6.83 g; 50 mmol) were charged, and the resultant mixture was refluxed for 4 hours while introducing nitrogen gas therein. Generation of hydrogen chloride gas through the condenser was confirmed by the use of a pH test paper. After completion of the reaction, the solvent was removed by evaporation to give a mixture of N-ethoxalylacrylamide and N-ethyloxalyl-3-chloropropionamide respectively in yields of 18.7% and 27.8% (determined by NMR).

EXAMPLES 24 TO 28

To a mixture of dioxane (1.63 g) and butyl acetate (0.70 g) kept at 100° C., the N-(substituted oxalyl)acrylamide (II) (1.00 g) and azobisisobutyronitrile (0.01 g) were added, and the resultant mixture was stirred at 100° C. for 3 hours. The thus produced polymer and their physical properties are shown in Table 4.

EXAMPLES 29 TO 33

To a mixture of dioxane (1.63 g) and butyl acetate (0.70 g) kept at 100° C., the N-(substituted oxalyl)acrylamide (II) (0.33 g), styrene (0.33 g), methyl methacrylate (0.33 g) and azobisisobutyronitrile (0.01 g) were added, and the resultant mixture was stirred at 100° C. for 3 hours. The thus produced polymer and their physical properties are shown in Table 4.

TABLE 4

$$CH_2=C-\underset{H}{C}-NH-C-C-OR \quad (II)$$
(with carbonyls O shown above each C)

| | Example No. | N-(Substituted oxalyl)acrylamide (II) (R) | Non-volatile content (%) | Molecular weight (Mn) | Mw/Mn |
|---|---|---|---|---|---|
| Homopolymer | 24 | —CH₂—⌬ 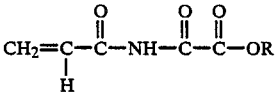 | 28.4 | 9,840 | 4.67 |
| | 25 | ⌬ 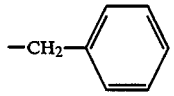 | 27.9 | 3,720 | 3.02 |
| | 26 | —CH₂C≡CH | 9.9 | 1,850 | 1.78 |
| | 27 | —C₂H₅ | 26.9 | 8,940 | 5.25 |
| | 28 | —CH₂CH=CH₂ | 24.5 | 4,560 | 3.50 |
| Copolymer | 29 | —CH₂—⌬  | 24.1 | 10,140 | 2.48 |
| | 30 | ⌬ 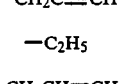 | 22.0 | 11,312 | 2.83 |
| | 31 | —CH₂C≡CH | 22.3 | 12,532 | 5.39 |
| | 32 | —C₂H₅ | 22.8 | 9,900 | 2.69 |
| | 33 | —CH₂CH=CH₂ | 20.7 | 10,520 | 2.73 |

EXAMPLE 34

By the aid of a bar coater, the polymer as obtained in Examples 24 to 28 was coated on a tin plate, followed by heating at 100° C. for 3 hours to give a coating film having a thickness of 20 u. The coating film was subjected to test for pencile hardness (maximum hardness producing no peeling), of which the results are shown in Table 5.

TABLE 5

| R | Example No. | Pencil hardness |
|---|---|---|
| −CH₂− 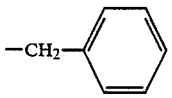 | 24 | H |
| 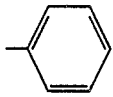 | 25 | H |
| −CH₂C≡CH | 26 | HB |
| −C₂H₅ | 27 | HB |
| −CH₂CH=CH₂ | 28 | HB |

EXAMPLE 35

To a Gamborg medium (modified by incorporation of sucrose (5% by weight), 2,4-D ($10^{-6}$M) and benzyladenine ($10^{-8}$M)), N-ethoxalylacrylamide or N-ethoxalylmethacrylamide was added to make a concentration of 10 or 100 ppm. Using this medium (100 ml), cells of *Euphorbia millii* was cultivated under the following conditions for 10 days: temperature, 26° C.; shaking, 120 rpm; illuminance, 6,000 lux. In comparison with the control, the growth of the cells was suppressed significantly in the medium containing N-ethoxalylacrylamide and not so significantly in the medium containing N-ethoxalylmethacrylamide.

What is claimed is:

1. An N-(substituted oxalyl)acrylamide of the formula: $CH_2$=CH—CO—NH—CO—CO—OR, wherein R has a molecular weight of not more than 500 and is selected from the group consisting of an alkenyl group, an alkynyl group, an aryl group, an aralkyl group and an alkyl group substituted with alkenyloxy.

2. The N-(substituted oxalyl)acrylamide according to claim 1, wherein R is allyl and which has a melting point of 42° to 43.5° C.

3. The N-(substituted oxalyl)acrylamide according to claim 1, wherein R is propargyl and which has a melting point of 102° to 103° C.

4. The N-(substituted oxalyl)acrylamide according to claim 1, wherein R is 2-hydroxyethylmethacryl and which is an oil.

5. The N-(substituted oxalyl)acrylamide according to claim 1, wherein R is benzyl and which has a melting point of 88° to 89° C.

6. The N-(substituted oxalyl)acrylamide according to claim 1, wherein R is phenyl and which has a melting point of 99° to 100° C.

7. A process for preparing an N-(substituted oxalyl)acrylamide of the formula $CH_2$=CH—CO—NH—CO—CO—OR, wherein R is selected from the group consisting of an alkyl group, an alkenyl group, an alkynyl group, a cycloalkyl group, an aryl group, an aralkyl group and an alkyl group substituted with alkenyloxy, which comprises reacting acrylamide with an oxalyl monohalide monoester of the formula: X—CO—CO—OR wherein R is as defined above and X is a hologen atom, in an inert solvent and treating the resultant N-(substituted oxalyl)-halopropionamide of the formula: X—CH₂CH₂—CO—NH—CO—CO—OR, wherein R and X are each as defined above, with a basic substance in an inert solvent.

8. A process for preparing an N-(substituted oxalyl)acrylamide of the formula $CH_2$=CH—CO—NH—CO—CO—OR, wherein R is selected from the group consisting of an alkyl group, an alkenyl group, an alkynyl group, a cycloalkyl group, an aryl group, an aralkyl group and an alkyl group substituted with alkenyloxy, which comprises reacting acrylamide with an oxalyl dihalide of the formula: X—CO—CO—X wherein X is a halogen atom, in an inert solvent in the absence of a basic substance, reacting the resulting N-(substituted oxalyl)-halopropionamide of the formula: X—CH₂—CH₂—CO—NH—CO—CO—X, wherein X is as defined above, with an alcohol of the formula: R—OH, wherein R is as defined above, in the absence of a basic substance and treating the resultant N-(substituted oxalyl)-halopropionamide of the formula: X—CH₂CH₂—CO—NH—CO—CO—OR, wherein R and X are each as defined above, with a basic substance.

* * * * *

UNITED STATES PATENT AND TRADEMARK OFFICE
CERTIFICATE OF CORRECTION

PATENT NO. : 4,914,225
DATED : April 3, 1990
INVENTOR(S) : Yuji SUZUKI, et al.

It is certified that error appears in the above-identified patent and that said Letters Patent is hereby corrected as shown below:

On the title page, delete [*] Notice:

The portion of the term of this patent subsequent to Sep. 25, 2001 has been disclaimed"

Signed and Sealed this

Sixteenth Day of February, 1993

Attest:

STEPHEN G. KUNIN

*Attesting Officer*      *Acting Commissioner of Patents and Trademarks*